(12) United States Patent
Sakata et al.

(10) Patent No.: US 11,151,863 B2
(45) Date of Patent: Oct. 19, 2021

(54) INFORMATION PROCESSING APPARATUS, ALARM MANAGEMENT SYSTEM, AND ALARM MANAGEMENT METHOD

(71) Applicant: YOKOGAWA ELECTRIC CORPORATION, Musashino (JP)

(72) Inventors: Yasunori Sakata, Musashino (JP); Takashi Sato, Musashino (JP); Kulasara Mahanama Siriwardena, Musashino (JP); Motoichi Kuwatani, Musashino (JP)

(73) Assignee: Yokogawa Electric Corporation, Musashino (JP)

( * ) Notice: Subject to any disclaimer, the term of this patent is extended or adjusted under 35 U.S.C. 154(b) by 0 days.

(21) Appl. No.: 16/890,163

(22) Filed: Jun. 2, 2020

(65) Prior Publication Data

US 2020/0388146 A1 Dec. 10, 2020

(30) Foreign Application Priority Data

Jun. 4, 2019 (JP) .............................. JP2019-104762

(51) Int. Cl.
 *G08B 25/14* (2006.01)
 *G05B 23/02* (2006.01)

(52) U.S. Cl.
 CPC ........... *G08B 25/14* (2013.01); *G05B 23/027* (2013.01)

(58) Field of Classification Search
 CPC ........ G08B 2/14; G08B 25/14; G05B 23/027; G06F 19/00

USPC ......................................................... 340/506
See application file for complete search history.

(56) References Cited

U.S. PATENT DOCUMENTS

| | | | | | |
|---|---|---|---|---|---|
| 5,996,023 | A | * | 11/1999 | Winter | ............. G08B 13/19604 709/253 |
| 6,006,019 | A | * | 12/1999 | Takei | .................... H04L 41/046 709/224 |
| 2018/0233026 | A1 | | 8/2018 | Litovtchenko et al. | |

FOREIGN PATENT DOCUMENTS

| | | |
|---|---|---|
| CN | 101498935 A | 8/2009 |
| CN | 207938166 U | 10/2018 |
| JP | 2005-084774 A | 3/2005 |

\* cited by examiner

*Primary Examiner* — John A Tweel, Jr.
(74) *Attorney, Agent, or Firm* — Sughrue Mion, PLLC

(57) ABSTRACT

An information processing apparatus includes a communication interface and a controller. The communication interface receives first alarm information indicating an alarm of a plant from a control apparatus and receives second alarm information, obtained by processing the first alarm information, from an alarm management apparatus that receives the first alarm information. The controller makes a judgment of whether the alarm management apparatus is usable, selects, in accordance with the result of the judgment, one of the first alarm information and the second alarm information received by the communication interface, and outputs third alarm information, obtained by the controller processing the selected alarm information, to a user.

7 Claims, 12 Drawing Sheets

INFORMATION PROCESSING APPARATUS, ALARM MANAGEMENT SYSTEM, AND ALARM MANAGEMENT METHOD

CROSS-REFERENCE TO RELATED APPLICATION

The present application claims priority to and the benefit of Japanese Patent Application No. 2019-104762 filed Jun. 4, 2019, the entire contents of which are incorporated herein by reference.

TECHNICAL FIELD

The present disclosure relates to an information processing apparatus, an alarm management system, and an alarm management method.

BACKGROUND

Patent literature (PTL) 1 discloses a technique related to an alarm management server that extracts an unnecessary alarm, based on message data of alarms occurring due to a process, and suppresses the occurrence of an alarm based on the extraction result.

CITATION LIST

Patent Literature

PTL 1: JP2005084774A

SUMMARY

An information processing apparatus according to an embodiment includes a communication interface and a controller. The communication interface is configured to receive first alarm information indicating an alarm of a plant from a control apparatus and to receive second alarm information, obtained by processing the first alarm information, from an alarm management apparatus configured to receive the first alarm information. The controller is configured to make a judgment of whether the alarm management apparatus is usable, to select, in accordance with a result of the judgment, one of the first alarm information and the second alarm information received by the communication interface, and to output selected alarm information, or third alarm information obtained by the controller processing the selected alarm information, to a user as presented alarm information. This information processing apparatus enables use of the first alarm information obtained directly from the control apparatus instead of the second alarm information, which is obtained by the alarm management apparatus processing the first alarm information, when the alarm management apparatus is not usable. Alarm information can thus be outputted to the user even when the alarm management apparatus is not usable.

An alarm management method according to an embodiment includes transmitting, using a control apparatus, first alarm information indicating an alarm of a plant to an information processing apparatus; receiving, using an alarm management apparatus, the first alarm information from the control apparatus; transmitting, using the alarm management apparatus, second alarm information obtained by processing the first alarm information to the information processing apparatus; receiving, using the information processing apparatus, the first alarm information from the control apparatus and the second alarm information from the alarm management apparatus; and making a judgment, using the information processing apparatus, of whether the alarm management apparatus is usable, selecting, in accordance with a result of the judgment, one of the first alarm information and the second alarm information that were received, and outputting selected alarm information, or third alarm information obtained by processing the selected alarm information, to a user as presented alarm information. This alarm management method enables the information processing apparatus to use the first alarm information obtained directly from the control apparatus instead of the second alarm information, which is obtained by the alarm management apparatus processing the first alarm information, when the alarm management apparatus is not usable. Alarm information can thus be outputted to the user even when the alarm management apparatus is not usable.

DETAILED DESCRIPTION

Figure 1:
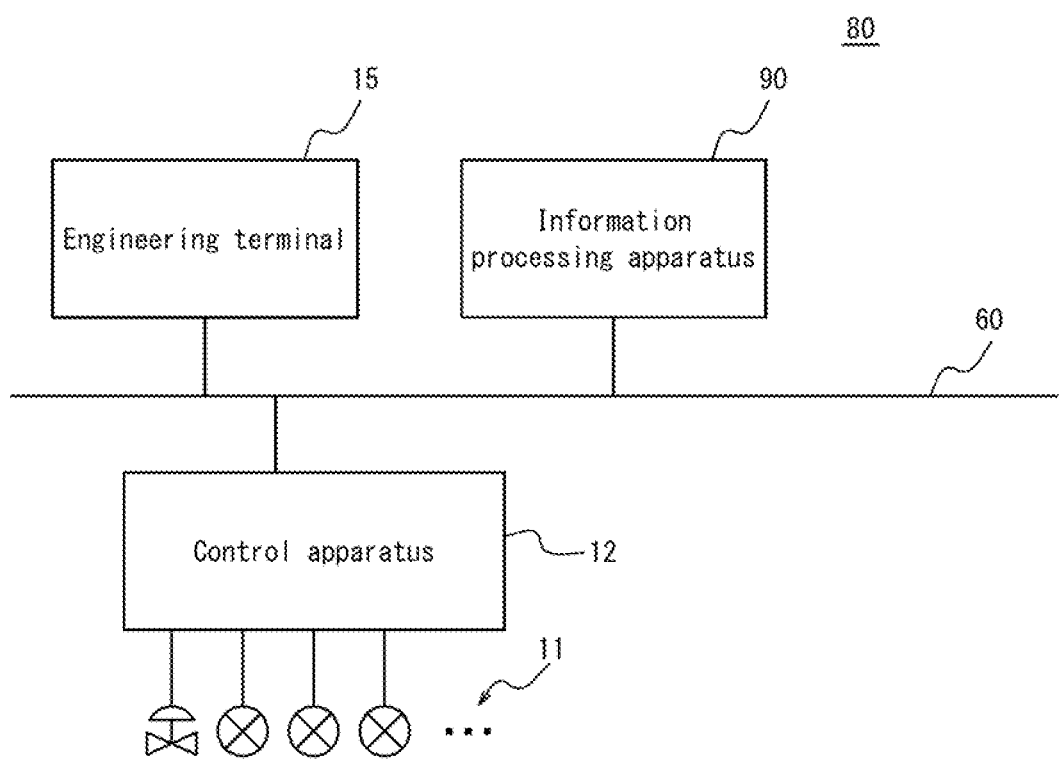
FIG. 1 is a block diagram illustrating the configuration of an alarm management system according to a comparative example.

A known technique is incapable of notifying an operator of an alarm message from a plant when an alarm management apparatus, such as an alarm management server, is not usable due to loss of power or failure or an abnormality in the power supply of the alarm management apparatus, inability to communicate with the alarm management apparatus, or other such reason.

It could therefore be helpful to output alarm information to the user even when the alarm management apparatus is not usable.

An information processing apparatus according to an embodiment includes a communication interface and a controller. The communication interface is configured to receive first alarm information indicating an alarm of a plant from a control apparatus and to receive second alarm information, obtained by processing the first alarm information, from an alarm management apparatus configured to receive the first alarm information. The controller is configured to make a judgment of whether the alarm management apparatus is usable, to select, in accordance with a result of the judgment, one of the first alarm information and the second alarm information received by the communication interface, and to output selected alarm information, or third alarm information obtained by the controller processing the selected alarm information, to a user as presented alarm information. This information processing apparatus enables use of the first alarm information obtained directly from the control apparatus instead of the second alarm information, which is obtained by the alarm management apparatus processing the first alarm information, when the alarm management apparatus is not usable. Alarm information can thus be outputted to the user even when the alarm management apparatus is not usable.

An information processing apparatus according to an embodiment may further include a storage including a first buffer configured to store the first alarm information received by the communication interface and a second buffer configured to store the second alarm information received by the communication interface, and the controller may be configured to select one of the first alarm information and the second alarm information in accordance with the result of the judgment by switching a buffer from which alarm information is read between the first buffer and the second buffer. This configuration enables accumulation of a certain amount of first alarm information obtained directly from the control apparatus when the alarm management apparatus is usable. Furthermore, the communication interface need not switch the acquisition source of the alarm information in accordance with whether the alarm management apparatus is usable.

In an information processing apparatus according to an embodiment, the controller may be configured so that, when the alarm management apparatus is not usable, the controller outputs the first alarm information or the third alarm information as the presented alarm information, the third alarm information being alarm information obtained by the controller processing the first alarm information, and outputs supplementary information, to the user, for providing notification that the alarm management apparatus is not usable. This configuration enables the user to clearly identify and respond to circumstances, such as whether the alarm management apparatus is usable, or which source is currently supplying information.

In an information processing apparatus according to an embodiment, the controller may be configured so that, when the alarm management apparatus is usable, the controller outputs the second alarm information as the presented alarm information, the second alarm information being alarm information obtained by the alarm management apparatus performing processing on the first alarm information to suppress an information amount, and when the alarm management apparatus is not usable, the controller obtains the third alarm information by performing processing on the first alarm information to suppress the information amount less than the processing by the alarm management apparatus and outputs the third alarm information as the presented alarm information. This configuration can suppress an increase in the alarm information outputted to the user even when the alarm management apparatus is not usable.

In an information processing apparatus according to an embodiment, the communication interface may be configured to receive the first alarm information from a plurality of control apparatuses, and the controller may be configured so that when the alarm management apparatus is not usable, the controller outputs the third alarm information as the presented alarm information, the third alarm information being control apparatus-specific alarm information obtained by the controller performing processing on the first alarm information in accordance with a control apparatus, among the plurality of control apparatuses, that transmitted the first alarm information. This configuration enables adjustment, for each control apparatus, of the degree to which an increase in the alarm information outputted to the user is suppressed when the alarm management apparatus is not usable.

An alarm management system according to an embodiment includes an information processing apparatus, a control apparatus, and an alarm management apparatus. This alarm management system enables the information processing apparatus to use the first alarm information obtained directly from the control apparatus instead of the second alarm information, which is obtained by the alarm management apparatus processing the first alarm information, when the alarm management apparatus is not usable. Alarm information can thus be outputted to the user even when the alarm management apparatus is not usable.

An alarm management method according to an embodiment includes transmitting, using a control apparatus, first alarm information indicating an alarm of a plant to an information processing apparatus; receiving, using an alarm management apparatus, the first alarm information from the control apparatus; transmitting, using the alarm management apparatus, second alarm information obtained by processing the first alarm information to the information processing apparatus; receiving, using the information processing apparatus, the first alarm information from the control apparatus and the second alarm information from the alarm management apparatus; and making a judgment, using the information processing apparatus, of whether the alarm management apparatus is usable, selecting, in accordance with a result of the judgment, one of the first alarm information and the second alarm information that were received, and outputting selected alarm information, or third alarm information obtained by processing the selected alarm information, to a user as presented alarm information. This alarm management method enables the information processing apparatus to use the first alarm information obtained directly from the control apparatus instead of the second alarm information, which is obtained by the alarm management apparatus processing the first alarm information, when the alarm management apparatus is not usable. Alarm information can thus be outputted to the user even when the alarm management apparatus is not usable.

The present disclosure can output alarm information to the user even when the alarm management apparatus is not usable.

Comparative Example

The configuration of an alarm management system 80 according to a comparative example is described with reference to FIG. 1.

The alarm management system 80 includes a control apparatus 12 connected to a device 11 of a plant and an information processing apparatus 90 connected to the control apparatus 12 via a network 60. Only one apparatus is illustrated as the information processing apparatus 90 in FIG. 1, but a plurality of apparatuses are actually provided.

In the present comparative example, the alarm management system 80 further includes an engineering terminal 15. The engineering terminal 15 is also connected to the control apparatus 12 via the network 60.

The control apparatus 12 outputs a system alarm message. Furthermore, when the control apparatus 12 detects an abnormality from a variation in a process based on a process value measured by the device 11, the control apparatus 12 transmits a process alarm message to the information processing apparatus 90. The alarm messages from the control apparatus 12 are displayed for viewing on the information processing apparatus 90.

Figure 2:
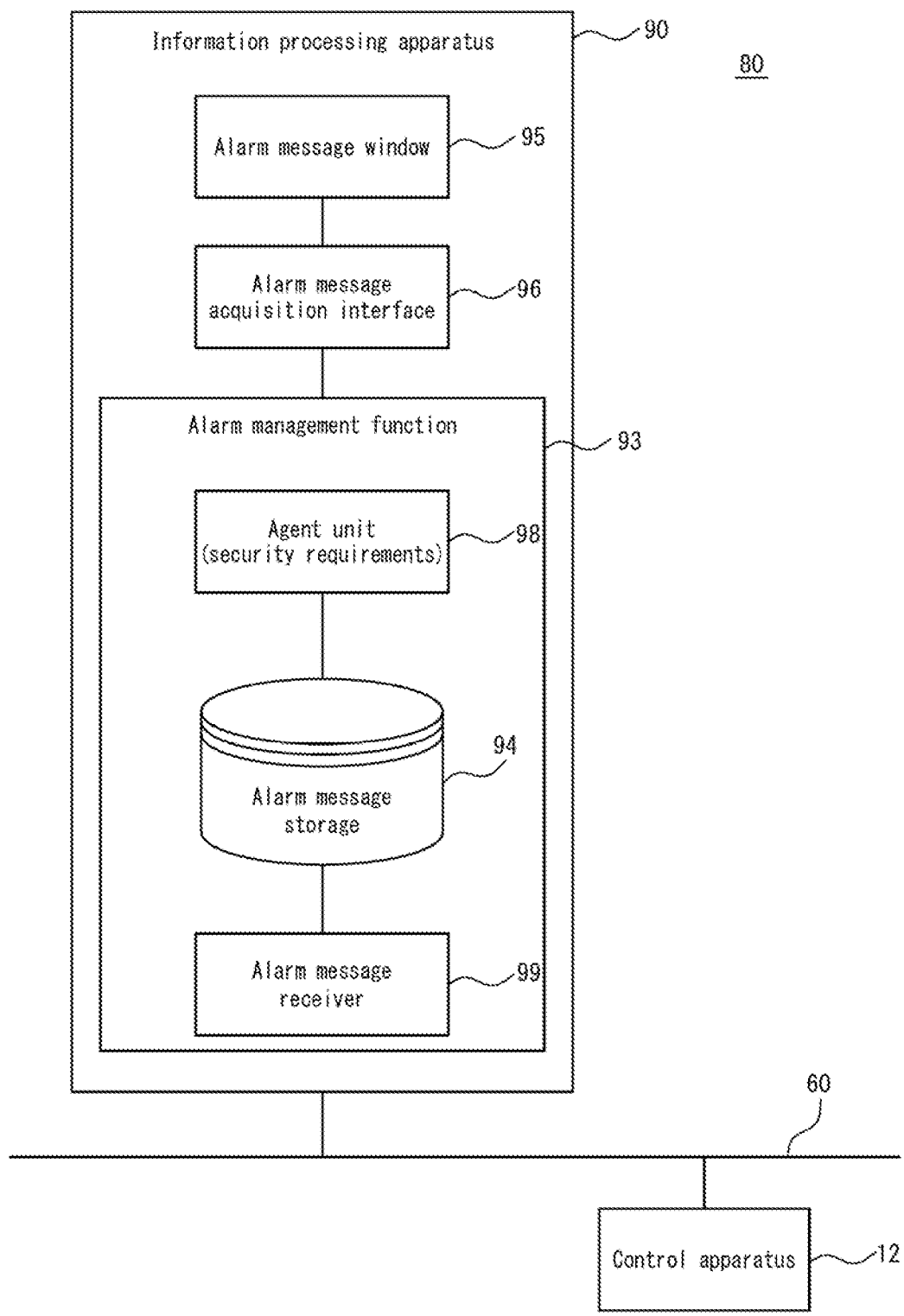
FIG. 2 is a block diagram illustrating the configuration of an alarm management system according to a comparative example.

The functional configuration of the information processing apparatus 90 is described with reference to FIG. 2.

The information processing apparatus 90 includes an alarm management function 93 for managing alarm messages.

The information processing apparatus 90 is notified of a state in the plant, such as an abnormality detected by the control apparatus 12, as an alarm message. The alarm message transmitted by the control apparatus 12 is received by an alarm message receiver 99 of the information processing apparatus 90 and is stored in an alarm message storage 94. An agent unit 98 creates a list of alarms within a monitoring range that the information processing apparatus 90 can handle and transmits the list to an alarm message acquisition interface 96. The monitoring range is decided by security requirements, such as access authority to the alarm information included in the alarm list. An alarm message window 95 displays the alarm list. The security requirements are defined within the engineering terminal 15 and downloaded onto the information processing apparatus 90.

Figure 3:
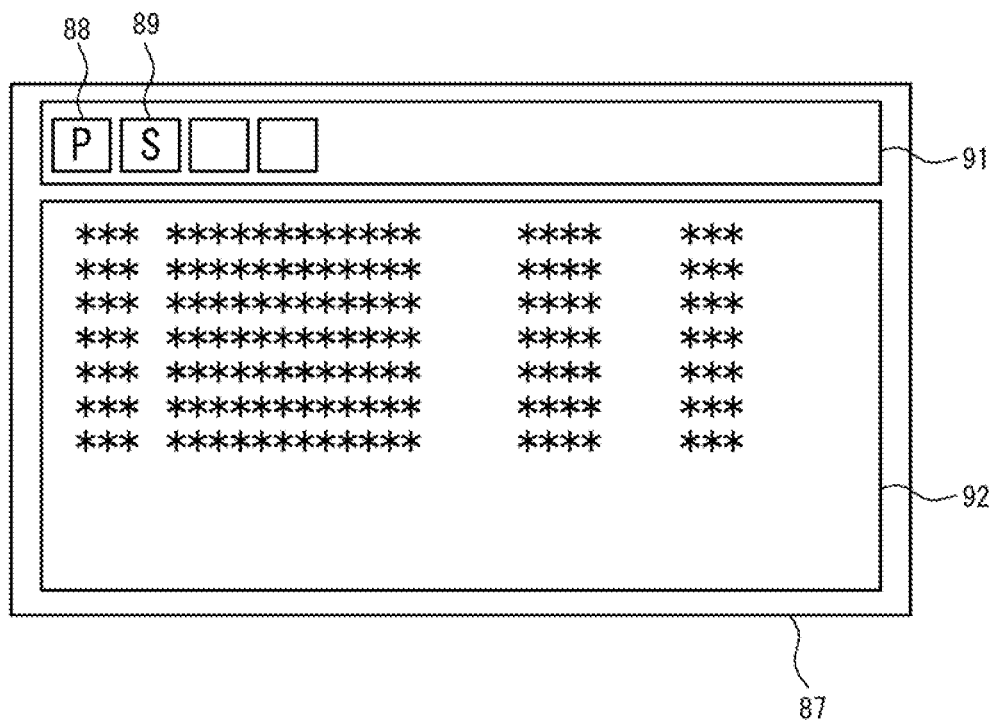
FIG. 3 illustrates an example screen of an alarm management system according to a comparative example.

FIG. 3 illustrates an example of a screen 87 in the alarm message window 95.

A toolbar 91 is displayed at the upper portion of the screen 87 in the alarm message window 95. A message view 92 is displayed below the toolbar 91 on the screen 87 in the alarm message window 95.

An alarm type can be selected by buttons, such as a first button 88 and a second button 89 in the toolbar 91. When the alarm type is selected, alarm messages related to the selected type of alarm are displayed on the message view 92.

As described above, alarms can be managed on the information processing apparatus 90 in the present comparative example. A regular personal computer (PC) or the like is typically used, however, as the information processing apparatus 90 operated by the operator. Performance limitations and the like make it unrealistic for high-level, complex functions related to alarm management to be introduced on the information processing apparatus 90. The control apparatus 12 has its own functions to fulfill, also making it unrealistic for high-level, complex functions related to alarm management to be introduced on the control apparatus 12. It therefore becomes necessary to introduce an additional apparatus having high-level, complex functions related to alarm management.

Embodiments of the present disclosure are now described with reference to the drawings.

Identical or equivalent portions in the drawings are labeled with the same reference signs. In the description of each embodiment, a description of identical or equivalent portions is omitted or simplified as appropriate.

First Embodiment

Figure 4:
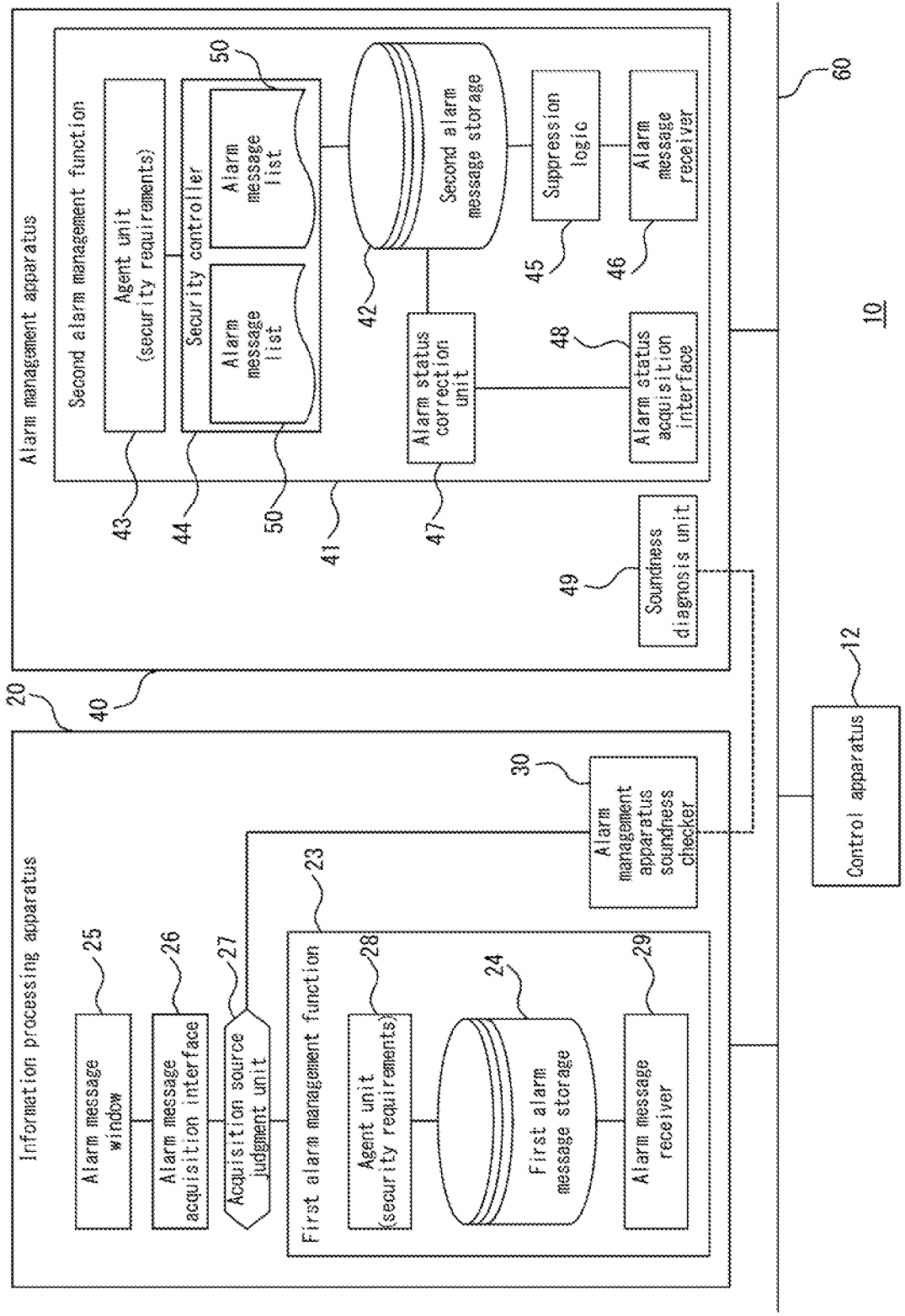
FIG. 4 is a block diagram illustrating the configuration of an alarm management system according to a first embodiment.

An overview of the present embodiment is provided with reference to FIG. 4.

In an alarm management system 10 according to the present embodiment, a control apparatus 12 transmits first alarm information indicating alarms of a plant to an information processing apparatus 20 and an alarm management apparatus 40. The alarm management apparatus 40 receives the first alarm information from the control apparatus 12. The alarm management apparatus 40 transmits second alarm information obtained by processing the first alarm information to the information processing apparatus 20. The information processing apparatus 20 receives the first alarm information from the control apparatus 12 and the second alarm information from the alarm management apparatus 40. The information processing apparatus 20 makes a judgment of whether the alarm management apparatus 40 is usable. The information processing apparatus 20 then selects, in accordance with the result of the judgment, one of the first alarm information and the second alarm information and outputs the selected alarm information to the user as presented alarm information.

In the present embodiment, the information processing apparatus 20 can use the first alarm information obtained directly from the control apparatus 12, instead of the second alarm information obtained by the alarm management apparatus 40 processing the first alarm information, when the alarm management apparatus 40 is not usable. Alarm information can thereby be outputted to the user even when the alarm management apparatus 40 is not usable.

In the present embodiment, the control apparatus 12 adds basic information to the alarm information. During the addition of basic information, a timestamp and status are added as minimum information. For example, the control apparatus 12 adds a timestamp and status to the data from the device 11 to generate an alarm message corresponding to the first alarm information. The control apparatus 12 transmits the generated alarm message to the information processing apparatus 20 and the alarm management apparatus 40.

In the present embodiment, the alarm management apparatus 40 adds high-level information to the alarm information. Information that is more complex and plentiful than the added basic information and that is useful to the operator for operating the plant, such as guidance, risk information or financial information, is added during the addition of high-level information. For example, upon receiving an alarm message from the control apparatus 12, the alarm management apparatus 40 adds information such as guidance, risk information or financial information to the received alarm message to generate an alarm message corresponding to the second alarm information. The alarm management apparatus 40 then transmits the generated alarm message to the information processing apparatus 20.

In addition to an industrial plant such as a chemical plant, examples of the plant include a plant for managing and controlling a well site, such as a gas field or oil field, or the surrounding area; a plant for managing and controlling power generation such as hydroelectric power, thermal power, or nuclear power; a plant for managing and controlling environmental power generation such as solar power or wind power; and a plant for managing and controlling water and sewage, a dam, or the like. Examples of the device 11 include a sensor device such as a flow meter or temperature sensor; a valve device, such as a flow control valve or opening/closing valve; an actuator, such as a fan or motor; and other plant devices.

As a modification to the present embodiment, the alarm management apparatus 40 may acquire first alarm information indirectly from another apparatus instead of acquiring the first alarm information directly from the control apparatus 12. It suffices for the control apparatus 12 to be an apparatus that transmits the first alarm information to the information processing apparatus 20 and that is a different type of apparatus from the alarm management apparatus 40. The control apparatus 12 need not be connected directly to the device 11 of the plant. For example, the control apparatus 12 may acquire data of the device 11 of the plant from another apparatus connected directly to the device 11 and generate an alarm message corresponding to the first alarm information based on the acquired data.

The configuration of the alarm management system 10 according to the present embodiment is described with reference to FIG. 4.

In the alarm management system 10, the information processing apparatus 90 of the alarm management system 80 according to the comparative example is replaced by the information processing apparatus 20, and the alarm management apparatus 40 is additionally provided. In other words, the alarm management system 10 includes the information processing apparatus 20, the control apparatus 12, and the alarm management apparatus 40. Only one apparatus is illustrated as the information processing apparatus 20 in FIG. 4, but a plurality of apparatuses are actually provided.

The alarm management system 10 may further include the engineering terminal 15 illustrated in FIG. 1.

The alarm management apparatus 40 manages alarm messages generated within the plant. The information processing apparatus 20 notifies the operator of the alarm messages. The alarm management apparatus 40 and the information processing apparatus 20 are implemented by a client-server model. The alarm management apparatus 40 is also used for activating alarm suppression logic in accordance with plant circumstances to reduce the total number of alarms for the operator. For example, if the alarm management apparatus 40 automatically suppresses alarm messages that accompany the occurrence of a certain event, the total number of alarms does not suddenly increase on all of the apparatuses functioning as information processing apparatuses 20. In a client-server model, however, alarm messages from the plant cannot be provided to the operator via the alarm management apparatus 40 when the alarm management apparatus 40 is not usable. This could lead to a major accident in the plant. A representative example of how to take into account the occurrence of an abnormality in the client-server model is to use multiple servers. A multiple configuration entails risk, however, of common cause failure of the alarm management apparatus 40. The present embodiment can therefore provide an alarm management system 10 that is resistant to common cause failure by providing a first alarm management function 23, which is a basic alarm management function, within the information processing apparatus 20. The "risk of common cause failure" refers to the risk of the servers failing or becoming non-functional simultaneously for the same reason, such as the same type of bug or defect, due to the hardware and software being the same on each of the multiple servers. In the present embodiment, alarm information can be presented via the alarm management apparatus 40, and alarm information directly from the control apparatus 12 can also be presented. Alarm information can thus be presented using different hardware and software, which can prevent both the main and backup from becoming non-functional simultaneously for the same reason.

The functional configuration of the information processing apparatus 20 and the alarm management apparatus 40 is described with reference to FIG. 4.

The information processing apparatus 20 includes the first alarm management function 23, which is a basic alarm management function. Logic for the system to automatically suppress alarms unnecessary for the operator is not performed in the first alarm management function 23. By contrast, the alarm management apparatus 40 includes a second alarm management function 41, which is a high-level alarm management function for managing the alarm messages generated within the plant. Suppression logic 45, which is logic for the system to automatically suppress alarms unnecessary for the operator, is performed in the second alarm management function 41. The suppression logic 45 may be fixed logic or may be variable logic that is continually edited using artificial intelligence (AI).

The information processing apparatus 20 and the alarm management apparatus 40 are notified of a state in the plant, such as an abnormality detected by the control apparatus 12, as an alarm message. The alarm message transmitted by the control apparatus 12 is received by an alarm message receiver 46 of the alarm management apparatus 40, is selected or discarded by the suppression logic 45, and is stored in a second alarm message storage 42. An agent unit 43 stores security requirements, which are condition definitions of which pieces of information are viewable by the information processing apparatus 20 or the operator. In accordance with these security requirements, a security controller 44 creates an alarm message list 50, which is a list of alarms within a monitoring range that the information processing apparatus 20 can handle, for each apparatus functioning as the information processing apparatus 20 and provides the alarm message list 50 to an alarm message acquisition interface 26 of the information processing apparatus 20. The monitoring range is a range viewable by each apparatus functioning as the information processing apparatus 20 and is decided by security requirements, which indicate conditions such as access authority to alarm information. The security requirements are defined within the engineering terminal 15 and downloaded onto the alarm management apparatus 40. An alarm status acquisition interface 48 acquires the latest alarm status and reflects the alarm status in the information stored in the second alarm message storage 42. A change in a process value in the plant and the control apparatus 12 or other such change in circumstances, such as a change from an abnormal value to a regular value, induces a change in alarm status. An alarm status correction unit 47 corrects the alarm status of the alarm messages stored in the second alarm message storage 42.

The alarm message transmitted by the control apparatus 12 is also received by an alarm message receiver 29 of the information processing apparatus 20 and is stored in a first alarm message storage 24. An agent unit 28 creates a list of alarms within a monitoring range that the information processing apparatus 20, or an operator logging in using the information processing apparatus 20, can view. The agent unit 28 then transmits the list to the alarm message acquisition interface 26. The monitoring range is a range viewable by each apparatus functioning as the information processing apparatus 20 and is decided by security requirements, which indicate conditions such as access authority to alarm information. As in the comparative example, the security requirements are defined within the engineering terminal 15 and downloaded onto the information processing apparatus 20.

An alarm management apparatus soundness checker 30 of the information processing apparatus 20 works together with a soundness diagnosis unit 49 of the alarm management apparatus 40 and examines the soundness of the alarm management apparatus 40. The examination of soundness of the alarm management apparatus 40 referred to here is not limited to an examination of whether the alarm management apparatus 40 itself is operating normally and includes an examination of whether communication with the alarm management apparatus 40 is being performed normally. In other words, the examination of soundness of the alarm management apparatus 40 is an examination of whether the alarm management apparatus 40 is usable. When the alarm management apparatus soundness checker 30 determines that the alarm management apparatus 40 is sound, an acquisition source judgment unit 27 judges that the alarm management apparatus 40 is the acquisition source, and the alarm message acquisition interface 26 acquires the alarm list from the alarm management apparatus 40. When the alarm management apparatus soundness checker 30 determines that the alarm management apparatus 40 is not sound, the acquisition source judgment unit 27 judges that the first alarm message storage 24 of the information processing apparatus 20 is the acquisition source, and the alarm message acquisition interface 26 acquires the alarm list from the first alarm message storage 24 of the information processing apparatus 20. An alarm message window 25 displays the alarm list acquired by the alarm message acquisition interface 26.

Figure 5:
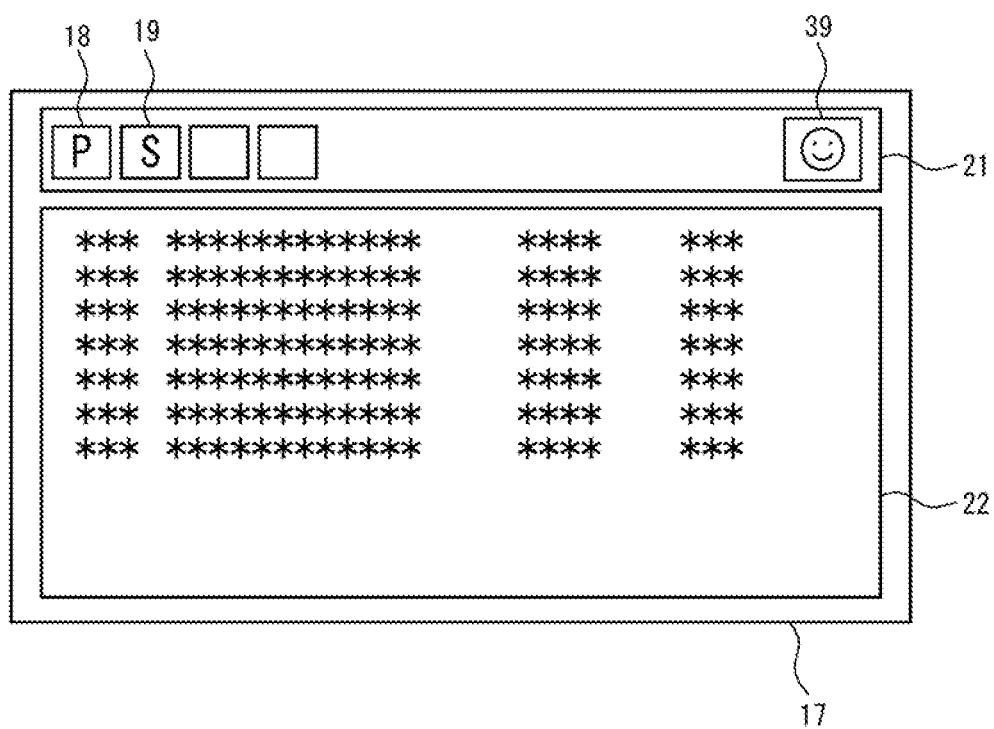
FIG. 5 illustrates an example screen of the alarm management system according to the first embodiment.

FIG. 5 illustrates an example of a screen 17 in the alarm message window 25 when the alarm management apparatus 40 is usable.

A toolbar 21 is displayed at the upper portion of the screen 17 in the alarm message window 25. A message view 22 is displayed below the toolbar 21 on the screen 17 in the alarm message window 25.

An alarm type can be selected by buttons, such as a first button 18 and a second button 19 in the toolbar 21. The first button 18 is a button for selecting process alarms. The second button 19 adjacent to the first button 18 is a button for selecting system alarms. When the process alarms are selected, alarm messages related to process alarms are displayed in the message view 22. When the system alarms are selected, alarm messages related to system alarms are displayed in the message view 22.

When the alarm management apparatus 40 is usable, the list of alarm messages acquired from the alarm management apparatus 40 is displayed on the message view 22.

In the present embodiment, the usability of the alarm management apparatus 40 is indicated by an icon 39 in the toolbar 21. In the example in FIG. 5, the smiling face indicates that the alarm management apparatus 40 is useable.

Figure 6:
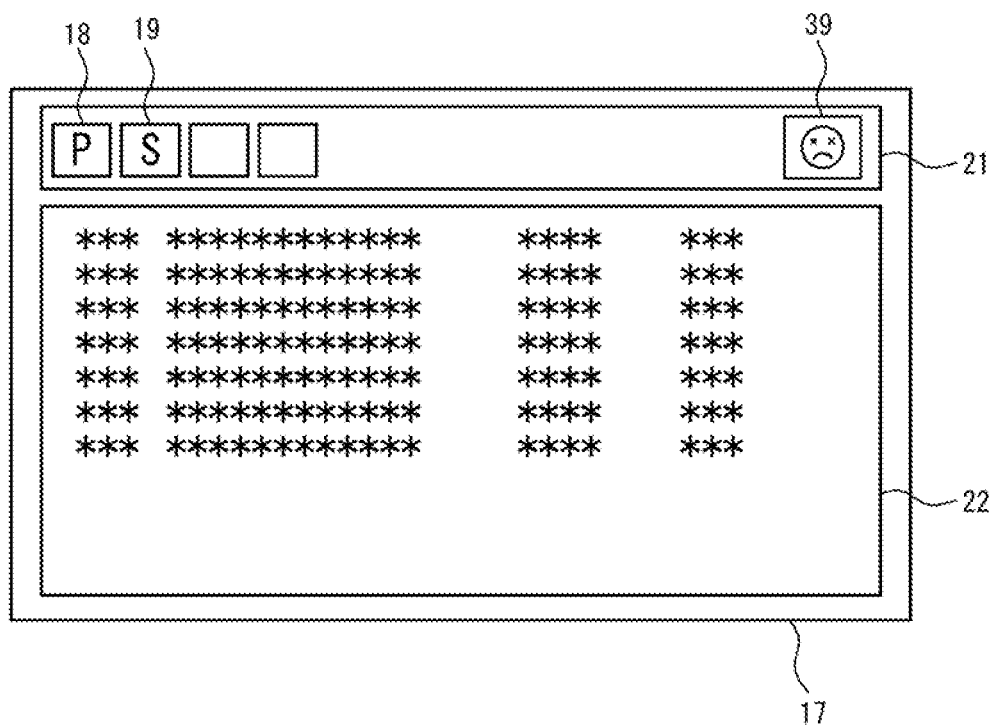
FIG. 6 illustrates an example screen of the alarm management system according to the first embodiment.

FIG. 6 illustrates an example of the screen 17 in the alarm message window 25 when the alarm management apparatus 40 is not usable.

When the alarm management apparatus 40 is not usable for a reason such as disruption of power to the alarm management apparatus 40, occurrence of an abnormality in the alarm management apparatus 40, or disruption of communication with the alarm management apparatus 40, the list of alarm messages acquired from the first alarm message storage 24 of the information processing apparatus 20 is displayed on the message view 22.

The list of alarm messages is supposed to be acquired from the alarm management apparatus 40 that performs high-level alarm management. Accordingly, the operator needs to be made aware that the information processing apparatus 20 is not acquiring the list from the alarm management apparatus 40 when such is the case. When the list is not being acquired from the alarm management apparatus 40, the information processing apparatus 20 therefore displays the icon 39 indicating that the alarm management apparatus 40 is not usable in the toolbar 21 at the upper part of the screen 17 of the information processing apparatus 20. In the example in FIG. 6, the frowning face indicates that the alarm management apparatus 40 is not useable. Instead of the icon 39 indicating that the alarm management apparatus 40 is not usable, an icon may be displayed to indicate whether information from the control apparatus 12 or the alarm management apparatus 40 is being used. Text or symbols may be displayed to indicate similar information, such as whether the alarm management apparatus 40 is usable, instead of the icon 39.

The list of alarm messages acquired from the first alarm message storage 24 of the information processing apparatus 20 is an example of the first alarm information indicating an alarm of the plant. The list of alarm messages acquired from the alarm management apparatus 40 is an example of the second alarm information acquired by processing the first alarm information. The list displayed on the message view 22 of the information processing apparatus 20 is an example of presented alarm information, which is alarm information selected from between the first alarm information and the second alarm information. The icon 39 indicating that the alarm management apparatus 40 is not usable is an example of supplementary information for providing notification that the alarm management apparatus 40 is not usable. The operator is an example of a user.

The alarm management apparatus soundness checker 30 of the information processing apparatus 20 communicates with the soundness diagnosis unit 49 of the alarm management apparatus 40 each unit of time, such as every second. The following three conditions are conditions for the alarm management apparatus soundness checker 30 to determine that the alarm management apparatus 40 is not sound. (1) Communication with the soundness diagnosis unit 49 of the alarm management apparatus 40 is not possible. For example, the alarm management apparatus 40 and the network 60 are not connected.
(2) No response is received from the soundness diagnosis unit 49 of the alarm management apparatus 40.
(3) The soundness diagnosis unit 49 of the alarm management apparatus 40 does not respond with "normal state". In other words, the soundness diagnosis unit 49 of the alarm management apparatus 40 responds with "abnormal state".

Figure 7:
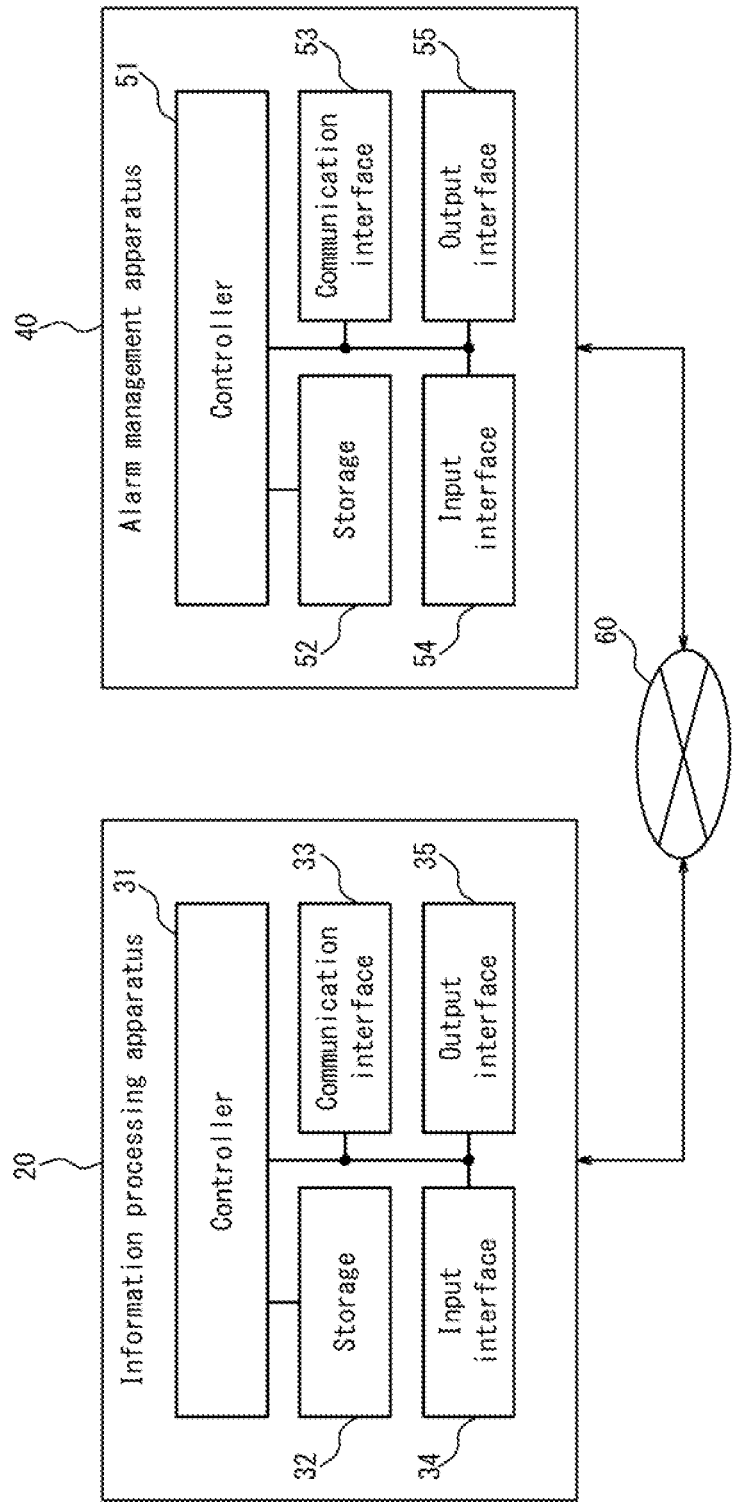
FIG. 7 is a block diagram illustrating the configuration of an information processing apparatus and an alarm management apparatus according to the first embodiment.

The configuration of the information processing apparatus 20 and the alarm management apparatus 40 according to the present embodiment is described with reference to FIG. 7.

The information processing apparatus 20 includes a controller 31, a storage 32, a communication interface 33, an input interface 34, and an output interface 35.

The controller 31 includes one or more processors. The processor may be a general-purpose processor, such as a central processing unit (CPU), or a dedicated processor specialized for particular processing. One or more dedicated circuits may be included in the controller 31, or one or more processors in the controller 31 may be replaced by one or more dedicated circuits. The dedicated circuit is, for example, a field-programmable gate array (FPGA) or an application specific integrated circuit (ASIC). The controller 31 executes information processing related to operation of the information processing apparatus 20 while controlling each part of the information processing apparatus 20.

The storage 32 includes one or more memories. The memory is, for example, semiconductor memory, magnetic memory, or optical memory. The semiconductor memory is, for example, random-access memory (RAM) or read-only memory (ROM). The RAM is, for example, static random access memory (SRAM) or dynamic random access memory (DRAM). The ROM is, for example, electrically erasable programmable read only memory (EEPROM). The memory functions as a main storage apparatus, a supplementary storage apparatus, or a cache memory, for example. Information used in operations of the information processing apparatus 20 and information acquired by operations of the information processing apparatus 20 are stored in the storage 32. In particular, the first alarm information, the second alarm information, and the supplementary information are stored in the storage 32. The storage 32 may be external. In other words, an external storage apparatus provided separately from the information processing apparatus 20 may communicate with or connect to the information processing apparatus 20.

The communication interface 33 includes one or more communication integrated circuits (IC). The communication IC is, for example, a local area network (LAN) communication IC. The communication interface 33 receives information used in operations of the information processing apparatus 20 over the network 60 or transmits information obtained by operations of the information processing apparatus 20 over the network 60.

The input interface 34 includes one or more input interfaces. The input interface is, for example, a USB interface. Via an input device, the input interface 34 receives operations to input information used in operations of the information processing apparatus 20. The input device is, for example, a physical key, a capacitance key, a pointing device, a touchscreen provided integrally with a display, or a microphone. The input device may be built into the information processing apparatus 20 or provided externally to the information processing apparatus 20.

The output interface 35 includes one or more output interfaces. The output interface is, for example, a USB interface. Via an output device, the output interface 35 outputs information obtained by operations of the information processing apparatus 20. The output device is, for example, a display or a speaker. The display is, for example, a liquid crystal display (LCD) or an electro luminescence (EL) display. The output device may be built into the information processing apparatus 20 or provided externally to the information processing apparatus 20.

The functions of the information processing apparatus 20 are implemented by the processor included in the controller 31 executing an information processing program according to the present embodiment. In other words, the functions of the information processing apparatus 20 are implemented by software. The information processing program is a program for causing a computer to execute the processing of the steps included in the operations of the information processing apparatus 20 to implement the functions corresponding to the processing of the steps. In other words, the information processing program is a program for causing a computer to function as the information processing apparatus 20.

The program can be recorded on a computer-readable recording medium. The computer-readable recording medium is, for example, a magnetic recording apparatus, an optical disc, a magneto-optical recording medium, or a semiconductor memory. This program can, for example, be distributed by the sale, transfer, lending, or the like of a portable recording medium such as a digital versatile disk (DVD) or a compact disc-read only memory (CD-ROM) with the program recorded thereon. The program may be distributed by being stored on a storage of a server and transferred from the server to another computer over the network 60. The program may be provided as a program product.

For example, the computer can temporarily store, in memory, the program recorded on the portable recording medium or transferred from the server. The computer then uses the processor to read the program stored in memory and execute processing in accordance with the read program. The computer may read the program directly from the portable recording medium and execute processing in accordance with the program. Each time the program is transferred from the server to the computer, the computer may sequentially execute processing in accordance with the received program. Processing may be executed by an application service provider (ASP) type of service that implements functions only via execution instructions and result acquisition, without transferring the program from the server to the computer. Examples of the program include an equivalent to a program represented as information provided for processing by an electronic computer. For example, data this is not a direct command for a computer but that has the property of specifying processing by the computer corresponds to the "equivalent to a program".

A portion or all of the functions of the information processing apparatus 20 may be implemented by a dedicated circuit included in the controller 31. In other words, a portion or all of the functions of the information processing apparatus 20 may be implemented by hardware.

The alarm management apparatus 40 includes a controller 51, a storage 52, a communication interface 53, an input interface 54, and an output interface 55.

The controller 51 includes one or more processors. The processor may be a general-purpose processor, such as a CPU, or a dedicated processor specialized for particular processing. One or more dedicated circuits may be included in the controller 51, or one or more processors in the controller 51 may be replaced by one or more dedicated circuits. The dedicated circuit is, for example, an FPGA or an ASIC. The controller 51 executes information processing related to operation of the alarm management apparatus 40 while controlling each part of the alarm management apparatus 40.

The storage 52 includes one or more memories. The memory is, for example, semiconductor memory, magnetic memory, or optical memory. The semiconductor memory is, for example, RAM or ROM. The RAM is, for example, SRAM or DRAM. The ROM is, for example, EEPROM. The memory functions as a main storage apparatus, a supplementary storage apparatus, or a cache memory, for example. Information used in operations of the alarm management apparatus 40 and information acquired by operations of the alarm management apparatus 40 are stored in the storage 52. In particular, the first alarm information and the second alarm information are stored in the storage 52. The storage 52 may be external. In other words, an external storage apparatus provided separately from the alarm management apparatus 40 may communicate with or connect to the alarm management apparatus 40.

The communication interface 53 includes one or more communication ICs. The communication IC is, for example, a LAN communication IC. The communication interface 53 receives information used in operations of the alarm management apparatus 40 over the network 60 or transmits information obtained by operations of the alarm management apparatus 40 over the network 60.

The input interface 54 includes one or more input interfaces. The input interface is, for example, a USB interface. Via an input device, the input interface 54 receives operations to input information used in operations of the alarm management apparatus 40. The input device is, for example, a physical key, a capacitance key, a pointing device, a touchscreen provided integrally with a display, or a microphone. The input device may be built into the alarm management apparatus 40 or provided externally to the alarm management apparatus 40.

The output interface 55 includes one or more output interfaces. The output interface is, for example, a USB interface. Via an output device, the output interface 55 outputs information obtained by operations of the alarm management apparatus 40. The output device is, for example, a display or a speaker. The display is, for example, an LCD or an EL display. The output device may be built into the alarm management apparatus 40 or provided externally to the alarm management apparatus 40.

The functions of the alarm management apparatus 40 are implemented by the processor included in the controller 51 executing an alarm management program according to the present embodiment. In other words, the functions of the alarm management apparatus 40 are implemented by software. The alarm management program is a program for causing a computer to execute the processing of the steps included in the operations of the alarm management apparatus 40 to implement the functions corresponding to the processing of the steps. In other words, the alarm management program is a program for causing a computer to function as the alarm management apparatus 40.

A portion or all of the functions of the alarm management apparatus 40 may be implemented by a dedicated circuit included in the controller 51. In other words, a portion or all of the functions of the alarm management apparatus 40 may be implemented by hardware.

Operations of the alarm management system 10 according to the present embodiment are described below. The operations of the alarm management system 10 correspond to an alarm management method according to the present embodiment.

The control apparatus 12 transmits first alarm information indicating alarms of the plant to the information processing apparatus 20 and the alarm management apparatus 40. The communication interface 33 of the information processing apparatus 20 and the communication interface 53 of the alarm management apparatus 40 receive the first alarm information from the control apparatus 12. The controller 51 of the alarm management apparatus 40 processes the first alarm information received by the communication interface 53. The communication interface 53 of the alarm management apparatus 40 transmits second alarm information, obtained as the result of processing by the controller 51, to the information processing apparatus 20. The communication interface 33 of the information processing apparatus 20 receives the second alarm information from the alarm management apparatus 40.

Specifically, the control apparatus 12 generates an alarm message at a predetermined point in time, such as when the unit time has elapsed, at the point in time at which an event occurs, such as detection of an abnormality in the plant, or at both points in time. The control apparatus 12 transmits the generated alarm message to both the information processing apparatus 20 and the alarm management apparatus 40 over the network 60 as the first alarm information. The communication interface 33 of the information processing apparatus 20 and the communication interface 53 of the alarm management apparatus 40 receive the alarm message from the control apparatus 12. The controller 51 of the alarm management apparatus 40 executes the suppression logic 45 to suppress the message load by extracting, from a sequence of alarm messages received by the communication interface 53, alarm messages that should be confirmed while discarding unnecessary alarm messages and the like. Alternatively, the controller 51 of the alarm management apparatus 40 may execute the suppression logic 45 to delete unnecessary alarms in a mechanical fashion that includes the decision of which alarms to suppress. The controller 51 of the alarm management apparatus 40 may instead execute the suppression logic 45 to automatically delete unnecessary alarms by performing high-level processing, such as having the system determine whether to suppress a certain alarm on a case-by-case basis, in accordance with circumstances in the plant and the like, without operator intervention. As necessary, the controller 51 of the alarm management apparatus 40 attaches various additional information, such as guidance, risk information or financial information, to the resulting alarm message. The financial information is information indicating the financial impact accompanying an alarm. The communication interface 53 of the alarm management apparatus 40 transmits the resulting alarm message to the information processing apparatus 20 over the network 60 as the second alarm information. The communication interface 33 of the information processing apparatus 20 receives the alarm message from the alarm management apparatus 40.

The controller 31 of the information processing apparatus 20 judges whether the alarm management apparatus 40 is usable. In accordance with the result of the judgment, the controller 31 selects one of the first alarm information and the second alarm information received by the communication interface 33. The controller 31 performs control to output the selected alarm information to the user as presented alarm information.

Figure 8:
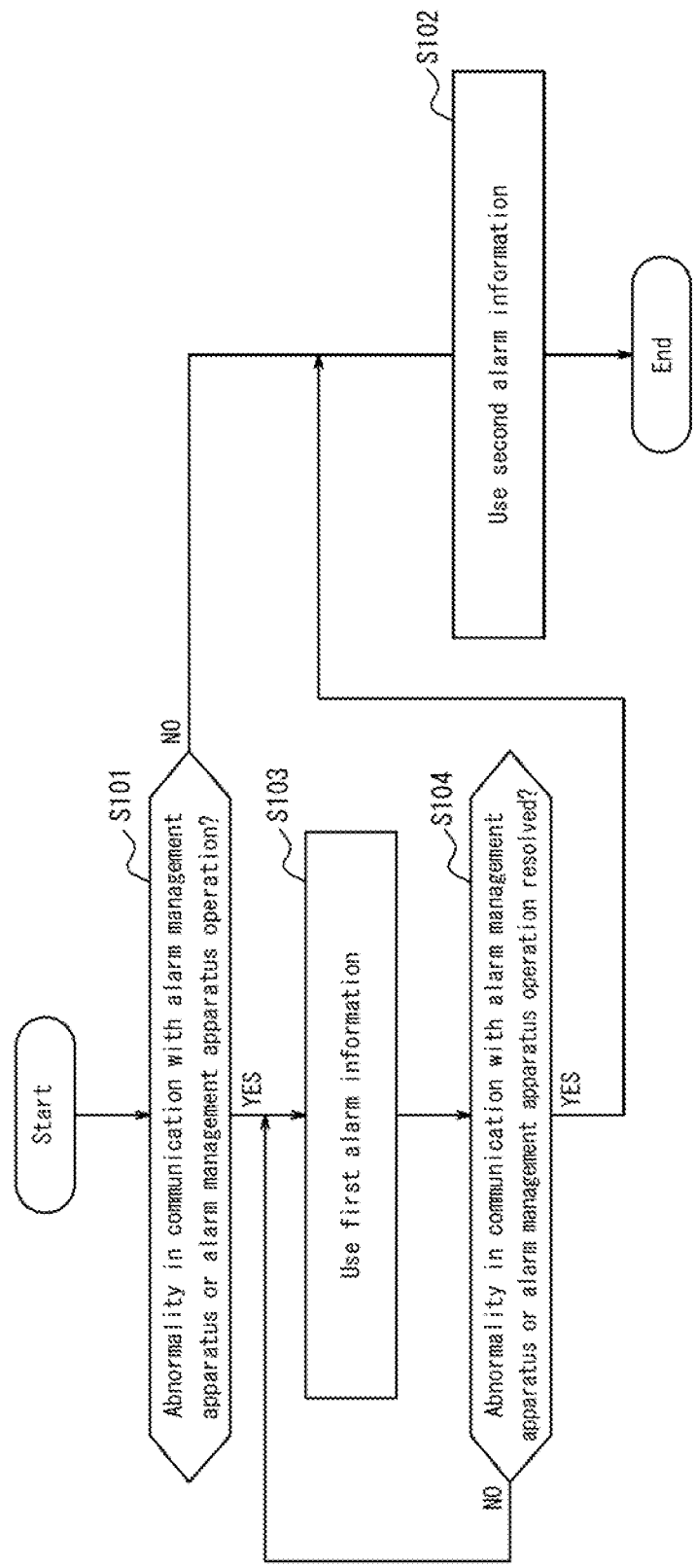
FIG. 8 is a flowchart illustrating operations of the information processing apparatus according to the first embodiment.

Specifically, the controller 31 performs the operations in FIG. 8.

In step S101, the controller 31 uses the alarm management apparatus soundness checker 30 to judge whether an abnormality in the communication with the alarm management apparatus 40 or an abnormality in the operations of the alarm management apparatus 40 has occurred. When it is judged that an abnormality has not occurred, the controller 31 controls the output interface 35 in step S102 to display the alarm messages received by the communication interface 33 from the alarm management apparatus 40 on the message view 22 as presented alarm information. Alternatively, the controller 31 may control a speaker included in the output interface 35 to output the alarm messages received by the communication interface 33 from the alarm management apparatus 40 audibly as presented alarm information. When it is judged that an abnormality has occurred, the controller 31 controls a display, included in the output interface 35, in step S103 to display the alarm messages received by the communication interface 33 from the control apparatus 12 on the message view 22 as presented alarm information. Alternatively, the controller 31 may control the speaker included in the output interface 35 to output the alarm messages received by the communication interface 33 from the control apparatus 12 audibly as presented alarm information.

After step S103, in step S104, the controller 31 uses the alarm management apparatus soundness checker 30 to judge whether the abnormality in the communication with the alarm management apparatus 40 or the abnormality in the operations of the alarm management apparatus 40 has been resolved. When it is judged that the abnormality has been resolved, the controller 31 controls the display, included in the output interface 35, in step S102 to display the alarm messages received by the communication interface 33 from the alarm management apparatus 40 on the message view 22 as presented alarm information. Alternatively, the controller 31 may control the speaker included in the output interface 35 to output the alarm messages received by the communication interface 33 from the alarm management apparatus 40 audibly as presented alarm information. When it is judged that the abnormality has not been resolved, the controller 31 controls the display, included in the output interface 35, in step S103 to display the alarm messages received by the communication interface 33 from the control apparatus 12 on the message view 22 as presented alarm information. Alternatively, the controller 31 may control the speaker included in the output interface 35 to output the alarm messages received by the communication interface 33 from the control apparatus 12 audibly as presented alarm information.

In the present embodiment, the controller 31 performs control, when the alarm management apparatus 40 is not usable, to output the alarm information obtained from the first alarm information as the presented alarm information, and performs control to output supplementary information, to the user, for providing notification that the alarm management apparatus 40 is not usable.

Specifically, when the controller 31 controls the output interface 35, in step S103, to display the alarm messages received by the communication interface 33 from the control apparatus 12 on the message view 22 as presented alarm information, the controller 31 controls the display included in the output interface 35 to display the icon 39, indicating that an abnormality in the communication with the alarm management apparatus 40 or an abnormality in the operations of the alarm management apparatus 40 has occurred, on the toolbar 21. Alternatively, the controller 31 may control the speaker included in the output interface 35 to audibly provide notification that an abnormality in the communication with the alarm management apparatus 40 or an abnormality in the operations of the alarm management apparatus 40 has occurred.

The present embodiment enables the user to clearly identify and respond to circumstances, such as whether the alarm management apparatus 40 is usable, or which source is currently supplying information. For example, the user does not become uneasy if changes occur, such as the suppression status of alarm information changing and the amount of acquired and displayed alarm information increasing due to the alarm management apparatus 40 becoming unusable.

Figure 9:
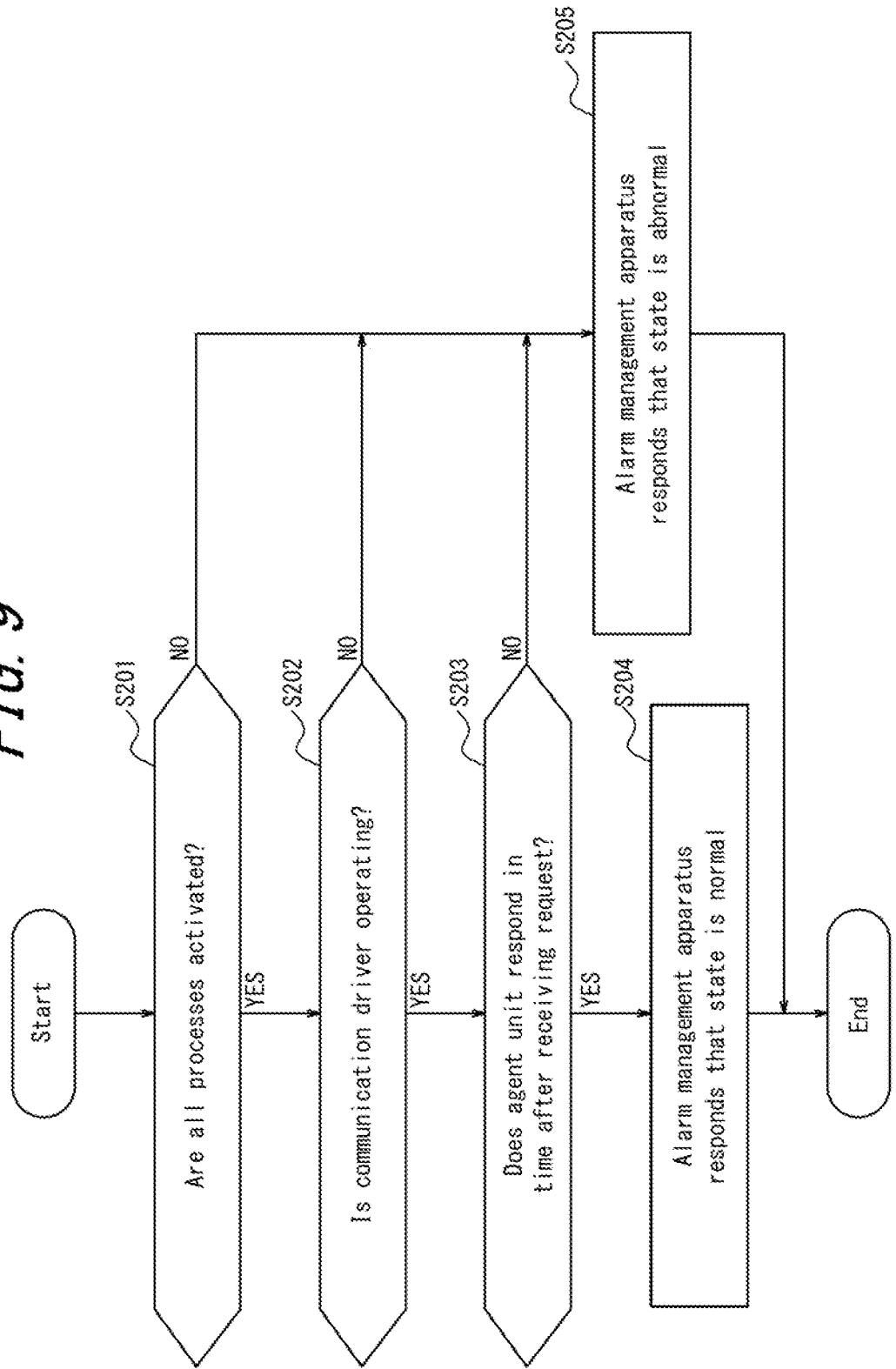
FIG. 9 is a flowchart illustrating operations of the alarm management apparatus according to the first embodiment.

In step S101 and step S104, the alarm management apparatus soundness checker 30 of the information processing apparatus 20 communicates with the soundness diagnosis unit 49 of the alarm management apparatus 40. At this time, the controller 51 of the alarm management apparatus 40 performs the operations in FIG. 9 using the soundness diagnosis unit 49.

In step S201, the controller 51 judges whether all processes have been activated. If all processes have been activated, the controller 51 judges whether a communication driver is operating in step S202. If the communication driver is operating, the controller 51 judges, in step S203, whether a response has been received within a specified time after the agent unit 43 receives a request for the alarm list. If the agent unit 43 has responded within the specified time after receiving the request, the controller 51 controls the communication interface 53, in step S204, to transmit a code indicating "normal state" to the information processing apparatus 20 over the network 60. If not all of the processes have been activated, if the communication driver is not operating, or if the agent unit 43 has not responded within the specified time after receiving the request, the controller 51 controls the communication interface 53, in step S205, to transmit a code indicating "abnormal state" to the information processing apparatus 20 over the network 60.

In the present embodiment, the communication interface 33 of the information processing apparatus 20 receives the first alarm information indicating alarms in the plant from the control apparatus 12 and also receives the second alarm information, obtained by processing the first alarm information, from the alarm management apparatus 40 that acquires the first alarm information, as described above. The controller 31 of the information processing apparatus 20 makes a judgment of whether the alarm management apparatus 40 is usable. The information processing apparatus 20 then selects, in accordance with the result of the judgment, one of the first alarm information and the second alarm information received by the communication interface 33 and performs control to output the selected alarm information to the user as presented alarm information.

The information processing apparatus 20 of the present embodiment can use the first alarm information obtained directly from the control apparatus 12 instead of the second alarm information, which is obtained by the alarm management apparatus 40 processing the first alarm information, when the alarm management apparatus 40 is not usable. Alarm information can thereby be outputted to the user even when the alarm management apparatus 40 is not usable.

The present embodiment enables the alarm management system 10 with a client-server configuration to provide the functions of the information processing apparatus 20 stably to the operator by virtue of effects (1) and (2) below.

(1) The information processing apparatus 20 acquires the alarm list from the first alarm management function 23 of the information processing apparatus 20 when the alarm management apparatus 40 is not usable. This enables the operator to receive the alarm list continuously.

(2) The information processing apparatus 20 can acquire the alarm list from the second alarm management function 41 when connection to the alarm management apparatus 40 is possible. The second alarm management function 41 includes a function to suppress alarms that the system determines to be unnecessary by performing logic when alarms occur frequently. Furthermore, the information processing apparatus 20 can add a variety of higher-level information to the alarms as necessary. Consequently, the operator can acquire an alarm list that is suppressed in a more advanced and appropriate manner than in (1) and to which is attached plentiful information to support the operator.

In the present embodiment, the information processing apparatus 20 can use alarm information transmitted directly from the control apparatus 12 to continue presenting alarm information to the operator regardless of whether the alarm management apparatus 40 is usable. The information processing apparatus 20 of the present embodiment continues to receive alarm information transmitted directly from the control apparatus 12 regardless of whether the alarm management apparatus 40 is usable.

The present embodiment enables the alarm management system 10 with a client-server configuration to display alarm messages for the operator even when communication with the alarm management apparatus 40 has been disrupted. In other words, alarm messages can continue to be displayed even when communication between the client and server has been disrupted.

When communication with the alarm management apparatus 40 is restored, the information processing apparatus 20 may automatically reconnect to the alarm management apparatus 40.

When a plurality of servers are installed as the alarm management apparatus 40, the present embodiment enables continual display of the alarm list on the information processing apparatus 20 even if common cause failure occurs in all of the servers. In other words, even if common cause failure occurs in multiple servers, the alarm list can be provided to the operator without loss as a result of the first alarm management function 23 operating on the information processing apparatus 20.

When multiple servers function as the alarm management apparatus 40, it suffices for the information processing apparatus 20 to connect to the alarm management apparatus 40 whose soundness diagnosis unit 49 responded with "normal state".

With the present embodiment, the display of the icon 39 in the toolbar 21 displayed at the upper portion of the screen 17 of the information processing apparatus 20 enables the operator to know that the alarm list is not being acquired from the alarm management apparatus 40 that executes high-level alarm management.

Figure 10:
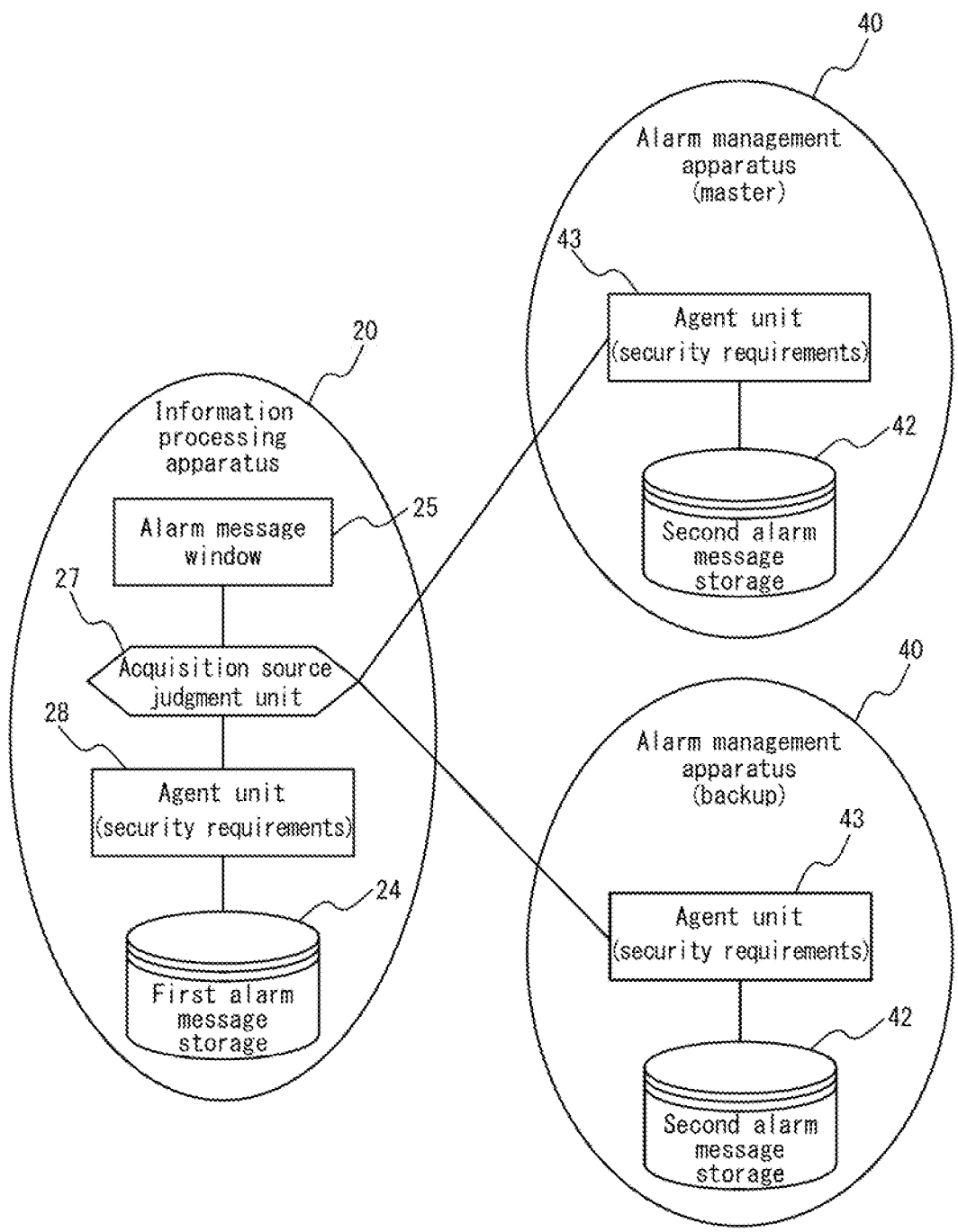
FIG. 10 is a block diagram illustrating the configuration of an information processing apparatus and an alarm management apparatus according to a modification to the first embodiment.

A modification to the present embodiment is described with reference to FIG. 10.

In the present modification, redundant servers function as the alarm management apparatus 40, and connection between the information processing apparatus 20 and a master server, between the information processing apparatus 20 and a backup server, and within the information processing apparatus 20 is attempted in this order. In other words, the information processing apparatus 20 acquires the alarm list from the master when connecting to the soundness diagnosis unit 49 operating on the master and receiving a "normal state" response. When unable to acquire the alarm list from the master, the information processing apparatus 20 acquires the alarm list from the backup when connecting to the soundness diagnosis unit 49 operating on the backup and receiving a "normal state" response. When unable to acquire the alarm list from the backup, the information processing apparatus 20 acquires the alarm list from the first alarm message storage 24 of the information processing apparatus 20.

Second Embodiment

Figure 11:
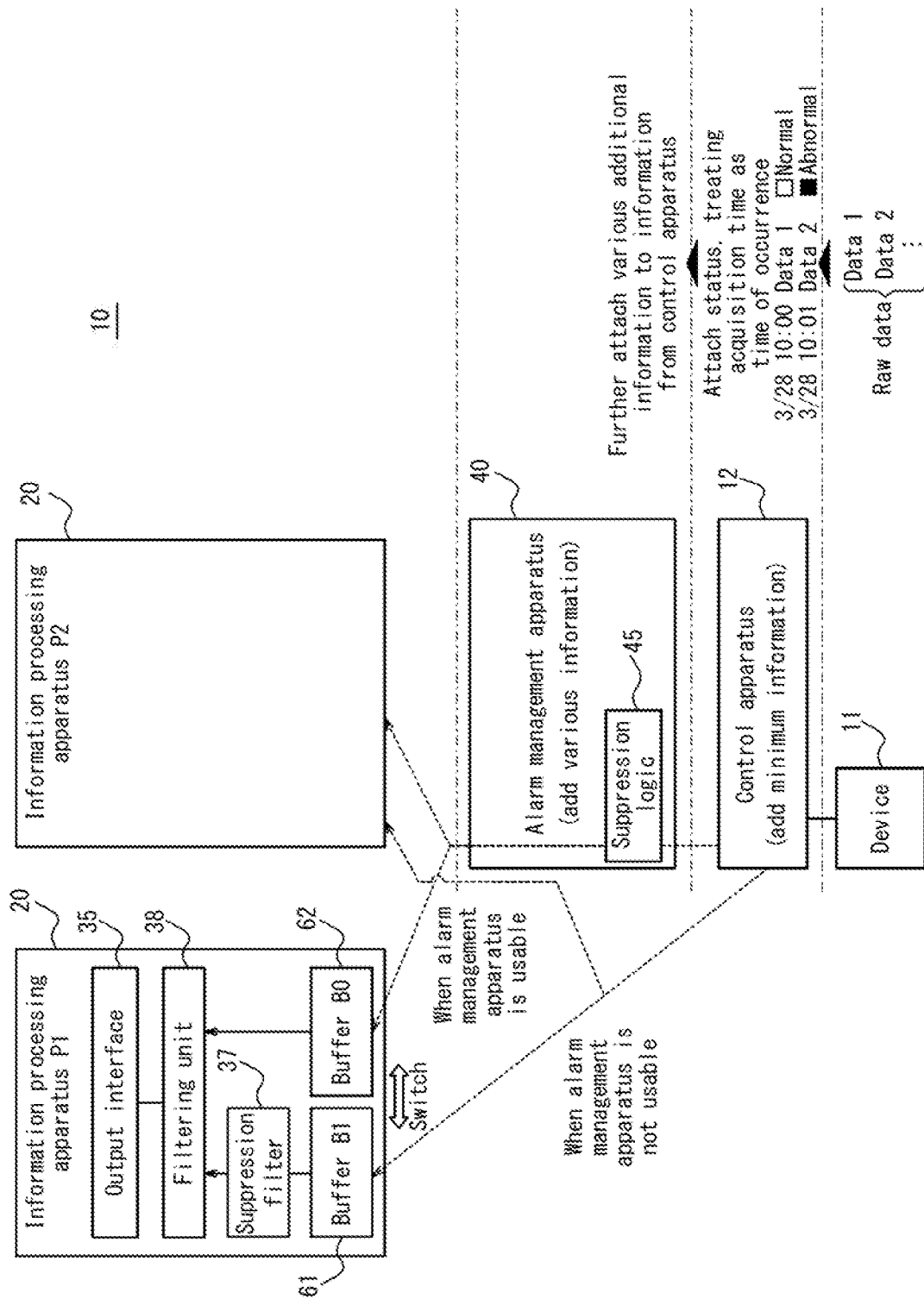
FIG. 11 is a block diagram illustrating the configuration of an alarm management system according to a second embodiment.

An overview of the present embodiment is provided with reference to FIG. 11.

In the first embodiment described above, the information processing apparatus 20 performs control to output the first alarm information as the presented alarm information when the alarm management apparatus 40 is not usable. By contrast, the information processing apparatus 20 in the second embodiment performs control to output third alarm information, obtained by processing the first alarm information, as the presented alarm information when the alarm management apparatus 40 is not usable. Specifically, when the alarm management apparatus 40 is not usable, the information processing apparatus 20 obtains the third alarm information by performing processing on the first alarm information to suppress the information amount and performs control to output this third alarm information as the presented alarm information. The alarm management apparatus 40 obtains the second alarm information by performing processing on the first alarm information to suppress the information amount and transmits the second alarm information to the information processing apparatus 20. The information processing apparatus 20 performs control to output the second alarm information as the presented alarm information when the alarm management apparatus 40 is usable. The processing by the information processing apparatus 20 suppresses the information amount less than the processing by the alarm management apparatus 40. Consequently, the processing load on the information processing apparatus 20 is smaller than the processing load on the alarm management apparatus 40. A typical computer, such as a PC, can therefore be used as the information processing apparatus 20, without the need for use of a high-performance computer.

In the present embodiment, the information processing apparatus 20 includes a first buffer 61 that acquires information from the control apparatus 12 and a second buffer 62 that acquires information from the alarm management apparatus 40. The control apparatus 12 determines whether the alarm management apparatus 40 is usable and automatically switches the source of the information displayed on the information processing apparatus 20. When the alarm management apparatus 40 is not usable, the information processing apparatus 20 does not use the alarm information acquired from the control apparatus 12 as is, but rather performs basic suppression of alarm information. In other words, the alarm management apparatus 40 normally has the entire alarm suppression function, but at least a portion of the alarm suppression function is also implemented on the information processing apparatus 20. This promotes stable monitoring and operation. For example, if the number of alarms suddenly increases when the alarm management apparatus 40 is not usable, the operator's operations and sense of judgment do not greatly change.

The basic suppression refers to the number of alarms being less restricted than when high-level suppression is performed by the alarm management apparatus 40 during normal operation of the alarm management apparatus 40. The number of alarms exhibits the relationship "number of alarms after high-level suppression"<"number of alarms after basic suppression"<"number of alarms without suppression".

Unnecessary information is not displayed as a result of minimal suppression during the basic suppression, whereas more appropriate and complex suppression than with the basic suppression is performed during the high-level suppression, and the amount of presented information is also reduced.

The control apparatus 12 in the present embodiment adds basic information to the alarm information as in the first embodiment, as illustrated in FIG. 11. During the addition of basic information, a timestamp and status are added as minimum information. In the present embodiment, the alarm management apparatus 40 adds high-level information to the alarm information, as in the first embodiment. Information that is more complex and plentiful than the added basic information, such as guidance, risk information or financial information, is added during the addition of high-level information.

The present embodiment is described below, focusing mainly on the differences from the first embodiment.

In the present embodiment, the alarm management system 10 includes an information processing apparatus P1 and an information processing apparatus P2 that are information processing apparatuses 20, the control apparatus 12, and the alarm management apparatus 40.

The information processing apparatus 20 includes a buffer B1 that is the first buffer 61, a buffer B0 that is the second buffer 62, a suppression filter 37, and a filtering unit 38 for narrowing down the information that the operator wants to see. The first buffer 61 and the second buffer 62 are included in the storage 32. For example, the first buffer 61 and the second buffer 62 may be implemented as separate memories or may be implemented in different storage regions of the same memory. Alternatively, an external storage may be connected to the information processing apparatus 20.

Operations of the alarm management system 10 according to the present embodiment are described below. The operations of the alarm management system 10 correspond to an alarm management method according to the present embodiment.

The control apparatus 12 analyzes the data from the device 11 of the plant. Each time an abnormality in the plant, the return from an abnormality, or another event requiring notification is detected, the control apparatus 12 generates an alarm message having attached thereto time information indicating the acquisition time of the data as the time of occurrence of the abnormality in the plant, the return, or the other event. The control apparatus 12 transmits the generated alarm message to both the information processing apparatus 20 and the alarm management apparatus 40 over the network 60 as the first alarm information. The communication interface 33 of the information processing apparatus 20 and the communication interface 53 of the alarm management apparatus 40 receive the alarm message from the control apparatus 12. The buffer B1 of the information processing apparatus 20 stores the alarm messages received by the communication interface 33 from the control apparatus 12.

The controller 51 of the alarm management apparatus 40 executes the suppression logic 45 to suppress the message load by extracting, from a sequence of alarm messages received by the communication interface 53, alarm messages that should be confirmed while discarding unnecessary alarm messages and the like. Alternatively, the controller 51 of the alarm management apparatus 40 may execute the suppression logic 45 to delete unnecessary alarms in a mechanical fashion that includes the decision of which alarms to suppress. The controller 51 of the alarm management apparatus 40 may instead execute the suppression logic 45 to automatically delete unnecessary alarms by performing high-level processing, such as having the system determine whether to suppress a certain alarm on a case-by-case basis, in accordance with circumstances in the plant and the like, without operator intervention. As necessary, the controller 51 attaches various additional information, such as guidance, risk information or financial information, to the resulting alarm message. The controller 51 may prioritize alarms on the alarm management apparatus 40 taking into account changes in plant situation. The communication interface 53 of the alarm management apparatus 40 transmits the resulting alarm message to the information processing apparatus 20 over the network 60 as the second alarm information. The communication interface 33 of the information processing apparatus 20 receives the alarm message from the alarm management apparatus 40. The buffer B0 of the information processing apparatus 20 stores the alarm messages received by the communication interface 33 from the alarm management apparatus 40.

As in step S101 of FIG. 8, the controller 31 of the information processing apparatus 20 uses the alarm management apparatus soundness checker 30 to judge whether an abnormality in the communication with the alarm management apparatus 40 or an abnormality in the operations of the alarm management apparatus 40 has occurred. When it is judged that an abnormality has not occurred, the controller 31 controls the display, included in the output interface 35, to display the alarm messages stored in the buffer B0 on the message view 22 as presented alarm information. Alternatively, the controller 31 may control the speaker included in the output interface 35 to output the alarm messages stored in the buffer B0 audibly as presented alarm information. When it is judged that an abnormality has occurred, the controller 31 executes the suppression filter 37 to remove alarm messages designated in advance as unnecessary from the alarm messages stored in the buffer B1 and extract alarm messages to be confirmed, thereby suppressing the message load. As necessary, the controller 31 further uses the filtering unit 38 to extract alarm messages that the operator wants to see from among the alarm messages to be confirmed. The controller 31 controls the display, included in the output interface 35, to display the extracted alarm messages on the message view 22 as presented alarm information. Alternatively, the controller 31 may control the speaker included in the output interface 35 to output the extracted alarm messages audibly as presented alarm information.

Subsequently, as in step S104 of FIG. 8, the controller 31 uses the alarm management apparatus soundness checker 30 to judge whether the abnormality in the communication with the alarm management apparatus 40 or the abnormality in the operations of the alarm management apparatus 40 has been resolved. When it is judged that the abnormality has been resolved, the controller 31 controls the display, included in the output interface 35, to display the alarm messages stored in the buffer B0 on the message view 22 as presented alarm information. Alternatively, the controller 31 may control the speaker included in the output interface 35 to output the alarm messages stored in the buffer B0 audibly as presented alarm information. When it is judged that the abnormality has not been resolved, the controller 31 executes the suppression filter 37 to remove alarm messages designated in advance as unnecessary from the alarm messages stored in the buffer B1 and extract alarm messages to be confirmed, thereby suppressing the message load. As necessary, the controller 31 further uses the filtering unit 38 to extract alarm messages that the operator wants to see from among the alarm messages to be confirmed. The controller 31 controls the display, included in the output interface 35, to display the extracted alarm messages on the message view 22 as presented alarm information. Alternatively, the controller 31 may control the speaker included in the output interface 35 to output the extracted alarm messages audibly as presented alarm information.

The suppression filter 37 of the information processing apparatus 20 is a filter for performing processing on the first alarm information to suppress the information amount. The suppression filter 37 stores setting information, indicating alarms to be excluded as selected by a person in advance, as a table or the like. The suppression filter 37 has the function of automatically excluding the corresponding alarms based on this setting information. The suppression logic 45 of the alarm management apparatus 40 is logic for performing processing for greater suppression of the information amount of the first alarm information than the processing by the information processing apparatus 20. The suppression logic 45 has the function of automatically deciding which alarms to exclude in accordance with the status of the plant or the like and of automatically excluding the corresponding alarms.

As a modification to the present embodiment, the control apparatus 12 may include a suppression filter instead of the information processing apparatus 20 including the suppression filter 37. In this case, the control apparatus 12 transmits alarm information, obtained by performing processing on the original alarm information to suppress the information amount, to the information processing apparatus 20 and the alarm management apparatus 40 as the first alarm information.

As a modification to the present embodiment, the control apparatus 12 may also include a suppression filter in addition to the information processing apparatus 20 including the suppression filter 37. In this case, the control apparatus 12 transmits alarm information, obtained by performing processing on the original alarm information to suppress the information amount, to the information processing apparatus 20 and the alarm management apparatus 40 as the first alarm information. The alarm management apparatus 40 may transmit alarm information, obtained by performing processing on the first alarm information to suppress the information amount more than the processing by the information processing apparatus 20 and more than the processing by the control apparatus 12, to the information processing apparatus 20 as the second alarm information.

As a modification to the present embodiment, the information processing apparatus 20 may store only the necessary alarm information, obtained by executing the suppression filter 37 on the first alarm information received in the buffer B1, separately in the first alarm message storage 24.

As described above, the controller 31 of the information processing apparatus 20 in the present embodiment performs control to output the second alarm information as the presented alarm information when the alarm management apparatus 40 is usable, the second alarm information being obtained by the alarm management apparatus 40 performing at least suppression processing. The "suppression processing" refers to processing the first alarm information to suppress the information amount. When the alarm management apparatus 40 is not usable, the controller 31 obtains the third alarm information by performing processing on the first alarm information to suppress the information amount less than the processing by the alarm management apparatus 40 and performs control to output this third alarm information as the presented alarm information.

The present embodiment can suppress an increase in the alarm information outputted to the user even when the alarm management apparatus 40 is not usable.

In the present embodiment, the storage of the information processing apparatus 20 includes the first buffer 61 that stores the first alarm information received by the communication interface 33 and the second buffer 62 that stores the second alarm information received by the communication interface 33. The controller 31 of the information processing apparatus 20 selects one of the first alarm information and the second alarm information by switching the buffer from which the alarm information is read between the first buffer 61 and the second buffer 62 in accordance with the result of the judgment of whether the alarm management apparatus 40 is usable.

The present embodiment enables accumulation of a certain amount of the first alarm information obtained directly from the control apparatus 12 when the alarm management apparatus 40 is usable. Furthermore, the communication interface 33 need not switch the acquisition source of the alarm information in accordance with whether the alarm management apparatus 40 is usable.

In the present embodiment, the communication interface 53 of the alarm management apparatus 40 receives the first alarm information indicating alarms in the plant from the control apparatus 12. The controller 51 of the alarm management apparatus 40 processes the first alarm information received by the communication interface 53. The communication interface 53 transmits second alarm information, obtained as the result of processing by the controller 51, to the information processing apparatus 20 that receives the first alarm information from the control apparatus 12. The information processing apparatus 20 outputs the second alarm information to the user as the presented alarm information when the alarm management apparatus 40 is usable. When the alarm management apparatus 40 is not usable, the information processing apparatus 20 obtains the third alarm information by performing processing on the first alarm information to suppress the information amount less than the processing by the alarm management apparatus 40 and outputs this third alarm information to the user as the presented alarm information.

The alarm management apparatus 40 of the present embodiment can more greatly suppress the information amount of the first alarm information than the processing performed by the information processing apparatus 20 when the alarm management apparatus 40 is not usable. Accordingly, when the alarm management apparatus 40 is usable, an increase in the alarm information outputted to the user can more easily be suppressed by the information processing apparatus 20 using the second alarm information obtained by the alarm management apparatus 40 processing the first alarm information.

Figure 12:
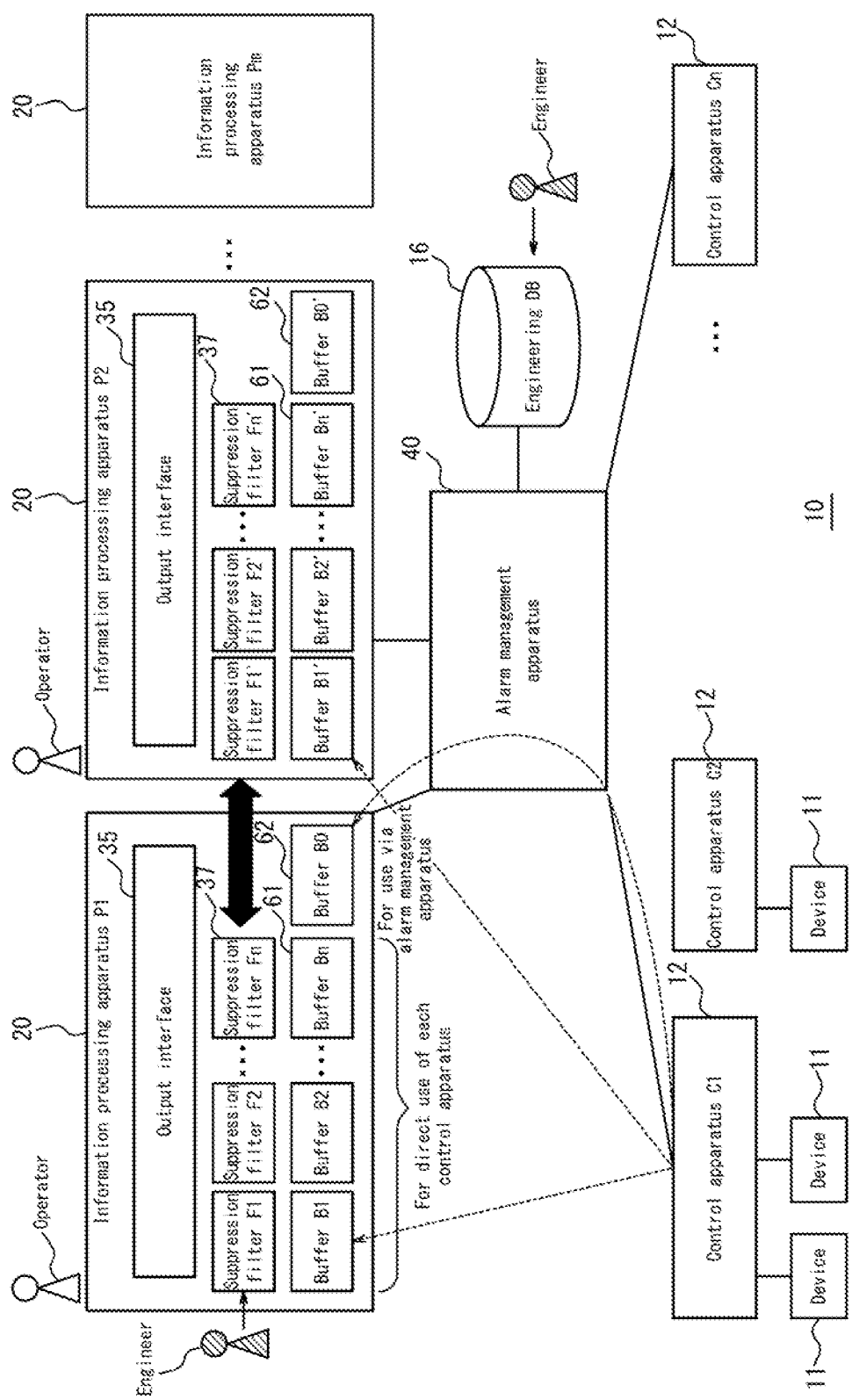
FIG. 12 is a block diagram illustrating the configuration of an alarm management system according to a modification to the second embodiment.

A modification to the present embodiment is described with reference to FIG. 12.

In this modification, the alarm management system 10 includes an information processing apparatus P1, an information processing apparatus P2, ..., and an information processing apparatus Pm that are information processing apparatuses 20, a control apparatus C1, a control apparatus C2, ..., and a control apparatus Cn that are control apparatuses 12, and the alarm management apparatus 40.

The information processing apparatus P1 includes a buffer B1, a buffer B2, ..., and a buffer Bn that are first buffers 61, a buffer B0 that is the second buffer 62, and a suppression filter F1, a suppression filter F2, ..., and a suppression filter Fn that are suppression filters 37. The information processing apparatus P1 may include the filtering unit 38 for narrowing down the information that the operator wants to see.

The information processing apparatus P2 includes a buffer B1', a buffer B2', ..., and a buffer Bn' that are first buffers 61, a buffer B0' that is the second buffer 62, and a suppression filter F1', a suppression filter F2', ..., and a suppression filter Fn' that are suppression filters 37. The information processing apparatus P2 may include the filtering unit 38 for narrowing down the information that the operator wants to see.

The other information processing apparatuses 20 have a configuration similar to that of the information processing apparatus P1 and the information processing apparatus P2.

The control apparatus C1 analyzes the data from the device 11 of the plant. Each time an abnormality in the plant, the return from an abnormality, or another event requiring notification is detected, the control apparatus C1 generates an alarm message having attached thereto time information indicating the acquisition time of the data as the time of occurrence of the abnormality in the plant, the return, or the other event. The control apparatus C1 transmits the generated alarm message to both the information processing apparatus 20 and the alarm management apparatus 40 over the network 60 as the first alarm information. The communication interface 33 of the information processing apparatus 20 and the communication interface 53 of the alarm management apparatus 40 receive the alarm message from the control apparatus C1. For example, the buffer B1 of the information processing apparatus P1 stores the alarm messages received by the communication interface 33 from the control apparatus C1. The buffer B1' of the information processing apparatus P2 stores the alarm messages received by the communication interface 33 from the control apparatus C1.

Similarly, the control apparatus C2 analyzes the data from the device 11 of the plant. Each time an abnormality in the plant, the return from an abnormality, or another event requiring notification is detected, the control apparatus C2 generates an alarm message having attached thereto time information indicating the acquisition time of the data as the time of occurrence of the abnormality in the plant, the return, or the other event. The control apparatus C2 transmits the generated alarm message to both the information processing apparatus 20 and the alarm management apparatus 40 over the network 60 as the first alarm information. The communication interface 33 of the information processing apparatus 20 and the communication interface 53 of the alarm management apparatus 40 receive the alarm message from the control apparatus C2. For example, the buffer B2 of the information processing apparatus P1 stores the alarm messages received by the communication interface 33 from the control apparatus C2. The buffer B2' of the information processing apparatus P2 stores the alarm messages received by the communication interface 33 from the control apparatus C2.

The communication interface 33 of the information processing apparatus 20 receives alarm messages from the alarm management apparatus 40 as second alarm information. For example, the buffer B0 of the information processing apparatus P1 stores the alarm messages received by the communication interface 33 from the alarm management apparatus 40. The buffer B0' of the information processing apparatus P2 stores the alarm messages received by the communication interface 33 from the alarm management apparatus 40.

For example, the controller 31 in the information processing apparatus P1 uses the alarm management apparatus soundness checker 30 to judge whether an abnormality in the communication with the alarm management apparatus 40 or an abnormality in the operations of the alarm management apparatus 40 has occurred. When it is judged that an abnormality has not occurred, the controller 31 controls the display, included in the output interface 35, to display the alarm messages stored in the buffer B0 on the message view 22 as presented alarm information. Alternatively, the controller 31 may control the speaker included in the output interface 35 to output the alarm messages stored in the buffer B0 audibly as presented alarm information. When it is judged that an abnormality has occurred, the controller 31 executes the suppression filter F1 to remove alarm messages designated in advance as unnecessary from the alarm messages stored in the buffer B1 and extract alarm messages to be confirmed, thereby suppressing the message load. The controller 31 executes the suppression filter F2 to remove alarm messages designated in advance as unnecessary from the alarm messages stored in the buffer B2 and extract alarm messages to be confirmed, thereby suppressing the message load. The controller 31 controls the display, included in the output interface 35, to display the alarm messages extracted by each control apparatus 12 on the message view 22 as presented alarm information. Alternatively, the controller 31 may control the speaker included in the output interface 35 to output the alarm messages extracted by each control apparatus 12 audibly as presented alarm information.

The controller 31 in the information processing apparatus P2 uses the alarm management apparatus soundness checker 30 to judge whether an abnormality in the communication with the alarm management apparatus 40 or an abnormality in the operations of the alarm management apparatus 40 has occurred. When it is judged that an abnormality has not occurred, the controller 31 controls the display, included in the output interface 35, to display the alarm messages stored in the buffer B0 on the message view 22 as presented alarm information. Alternatively, the controller 31 may control the speaker included in the output interface 35 to output the alarm messages stored in the buffer B0 audibly as presented alarm information. When it is judged that an abnormality has occurred, the controller 31 executes the suppression filter F1' to remove alarm messages designated in advance as unnecessary from the alarm messages stored in the buffer BP and extract alarm messages to be confirmed, thereby suppressing the message load. The controller 31 executes the suppression filter F2' to remove alarm messages designated in advance as unnecessary from the alarm messages stored in the buffer B2' and extract alarm messages to be confirmed, thereby suppressing the message load. The controller 31 controls the display, included in the output interface 35, to display the alarm messages extracted for each control apparatus 12 on the message view 22 as presented alarm information. Alternatively, the controller 31 may control the speaker included in the output interface 35 to output the alarm messages extracted by each control apparatus 12 audibly as presented alarm information.

The operator views the alarm information displayed on the message view 22. The engineer designs the suppression filter 37. The engineer also uses an engineering database (DB) 16 connected to the alarm management apparatus 40 to designate which alarm information should be send to which information processing apparatus 20. Therefore, when the alarm management apparatus 40 is usable, information that is suppressed in amount while having various information added to each piece of information can be sent to each information processing apparatus 20. The information that is sent is stored in the second buffer 62 for information from the server, such as the buffer B0, on each information processing apparatus 20.

As described above, the communication interface 33 of the information processing apparatus 20 in the present modification receives the first alarm information from a plurality of control apparatuses 12. When the alarm management apparatus 40 is not usable, the controller 31 of the information processing apparatus 20 outputs the third alarm information as the presented alarm information, the third alarm information being control apparatus 12 specific alarm information obtained by the controller 31 performing processing on the first alarm information in accordance with the control apparatus 12 that transmitted the first alarm information.

The present modification enables adjustment, for each control apparatus 12, of the degree to which an increase in the alarm information outputted to the user is suppressed when the alarm management apparatus 40 is not usable.

The present disclosure is not limited to the above embodiments. For example, a plurality of the blocks listed in the block diagram may be integrated, or one block may be divided. Instead of the plurality of steps listed in the flowcharts being executed sequentially as described above, the steps may be executed in parallel or in a different order as necessary or in accordance with the processing capability of the apparatus executing the steps. Other changes that do not depart from the scope of the present disclosure may also be made.

The invention claimed is:

1. An information processing apparatus comprising:
a communication interface configured to receive first alarm information indicating an alarm of a plant from a control apparatus and to receive second alarm information, obtained by processing the first alarm information, from an alarm management apparatus configured to receive the first alarm information; and
a controller configured to make a judgment of whether the alarm management apparatus is operating normally or whether communication with the alarm management apparatus is performed normally, to select, in accordance with a result of the judgment, one of the first alarm information and the second alarm information received by the communication interface, and to output selected alarm information, or third alarm information obtained by the controller processing the selected alarm information, to a user as presented alarm information.

2. The information processing apparatus of claim 1, further comprising:
a storage comprising a first buffer configured to store the first alarm information received by the communication interface and a second buffer configured to store the second alarm information received by the communication interface;
wherein the controller is configured to select one of the first alarm information and the second alarm information in accordance with the result of the judgment by switching a buffer from which alarm information is read between the first buffer and the second buffer.

3. The information processing apparatus of claim 1, wherein when the alarm management apparatus is not operating normally or when the communication with the alarm management apparatus is not performed normally, the controller is configured to output the first alarm information or the third alarm information as the presented alarm information, the third alarm information being alarm information obtained by the controller processing the first alarm information, and to output supplementary information, to the user, for providing notification that an abnormality in operations of the alarm management apparatus or an abnormality in the communication with the alarm management apparatus has occurred.

4. The information processing apparatus of claim 1, wherein when the alarm management apparatus is operating normally or when the communication with the alarm management apparatus is not performed normally, the controller is configured to output the second alarm information as the presented alarm information, the second alarm information being alarm information obtained by the alarm management apparatus performing processing in which the first alarm information is selected or discarded to reduce an amount of the first alarm information, and when the alarm management apparatus is not operating normally or when the communication with the alarm management apparatus is not performed normally, the controller is configured to obtain the third alarm information by performing processing in which the first alarm information is selected or discarded to reduce the amount of the first alarm information by an amount less than the processing by the alarm management apparatus, and to output the third alarm information as the presented alarm information.

5. The information processing apparatus of claim 1,
wherein the communication interface is configured to receive the first alarm information from a plurality of control apparatuses; and
wherein when the alarm management apparatus is not operating normally or when the communication with the alarm management apparatus is not performed normally, the controller is configured to output the third alarm information as the presented alarm information, the third alarm information being control apparatus-specific alarm information obtained by the controller performing processing on the first alarm information in accordance with a control apparatus, among the plurality of control apparatuses, that transmitted the first alarm information.

6. An alarm management system comprising:
the information processing apparatus of claim 1;
the control apparatus; and
the alarm management apparatus.

7. An alarm management method comprising:
transmitting, using a control apparatus, first alarm information indicating an alarm of a plant to an information processing apparatus;
receiving, using an alarm management apparatus, the first alarm information from the control apparatus;
transmitting, using the alarm management apparatus, second alarm information obtained by processing the first alarm information to the information processing apparatus;
receiving, using the information processing apparatus, the first alarm information from the control apparatus and the second alarm information from the alarm management apparatus; and
making a judgment, using the information processing apparatus, of whether the alarm management apparatus is operating normally or whether communication with the alarm management apparatus is performed normally, selecting, in accordance with a result of the judgment, one of the first alarm information and the second alarm information that were received, and outputting selected alarm information, or third alarm information obtained by processing the selected alarm information, to a user as presented alarm information.

* * * * *